No. 738,631. Patented September 8, 1903.

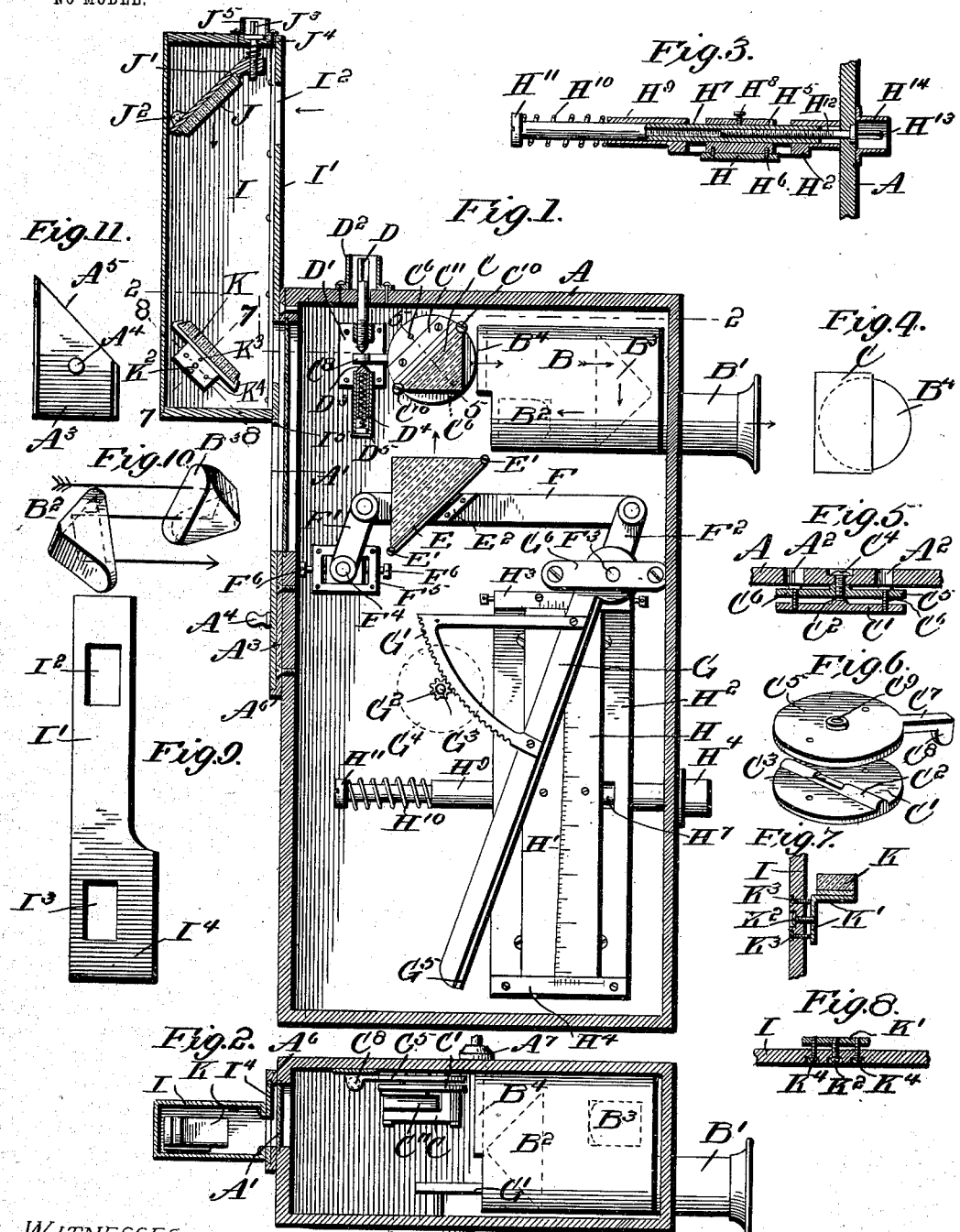

UNITED STATES PATENT OFFICE.

GEORGE N. SAEGMULLER AND GEORGE M. SEARLE, OF WASHINGTON, DISTRICT OF COLUMBIA.

DISTANCE INSTRUMENT.

SPECIFICATION forming part of Letters Patent No. 738,631, dated September 8, 1903.

Application filed February 24, 1903. Serial No. 144,719. (No model.)

*To all whom it may concern:*

Be it known that we, GEORGE N. SAEGMULLER and GEORGE M. SEARLE, citizens of the United States, residing at Washington, District of Columbia, have invented certain new and useful Improvements in Distance Instruments, of which the following is a specification, reference being had therein to the accompanying drawings.

This invention relates to a distance instrument, and particularly to a mechanical device for immediately and simply obtaining by inspection the mathematical result of what is known as "Buckner's method of distance measurement," which consists in measuring the angle between the visible horizon and the water-line of the object the distance of which is required.

The invention has for an object to present an improvement in the construction and operation of the parts in the structure shown in our Patents Nos. 686,770 and 686,771, of November 19, 1901, by which the accuracy of the instrument is increased and the parts are adapted for location within a smaller and more convenient compass.

A further object of the invention is to provide a reflecting attachment by which an observation may be taken toward the shore and the visible horizon reflected from behind the observer.

Other and further objects and advantages of the invention will be hereinafter set forth, and the novel features of the same defined by the appended claims.

In the drawings, Figure 1 is a vertical section through the instrument. Fig. 2 is a horizontal section on the line 2 2 of Fig. 1. Fig. 3 is a vertical section through the adjusting device for the measuring-scale. Fig. 4 is a diagrammatic elevation of the object-glass of the telescope and the prism directly in front of the same. Fig. 5 is a vertical section on the line 5 5 of Fig. 1, showing the holder for the upper prism. Fig. 6 is a detail perspective of this holder. Fig. 7 is a vertical section on the line 7 7 of Fig. 1 through the lower reflecting-mirror. Fig. 8 is a similar section on the line 8 8 of Fig. 1. Fig. 9 is an elevation of the open face of the reflector-casing. Fig. 10 is a diagrammatic perspective of the arrangement of prisms in the telescope, and Fig. 11 is an elevation of the slide upon the front of the casing.

Like letters of reference refer to like parts in the several figures of the drawings.

The letter A designates a casing which is of any preferred construction and configuration and provided upon its front with a sight-opening A′, which may be suitably protected by a transparent covering. Within this casing any desired form of sight-tube, peep-sight, or telescope may be provided, and for illustration a desirable construction of prismatic telescope B is herein shown in which the eyepiece B′ is provided with the usual lens, and at the forward part of the lower portion of the casing a double prism $B^2$ is provided, while at the rear of the casing opposite one-half of the prism $B^2$ is a corresponding prism $B^3$, vertically disposed in alinement with an object-lens $B^4$, so that the light-ray passing therethrough traverses the course diagrammatically shown in Fig. 10. In front of this object-lens a prism C is disposed and covers slightly more than one-half of the lens, as shown in Fig. 4, the object thereof being to produce an even light in the lens, as some of the light-rays passing through the prism are so diffused that the direct image upon the uncovered portion of the lens would be much stronger were not this uneven division provided.

The prism C is mounted upon a supporting-plate C′, having on its under face a curved transverse rib $C^2$, provided with a central flattened portion $C^3$, forming a space for the end of the securing-screw $C^4$, which passes through the casing and is threaded into the adjustable holding-plate $C^5$. The curved rib $C^3$ rocks upon this adjusting-plate, and the plate also carries screws $C^6$, passing therethrough and threaded into the plate C′, the head thereof being accessible through suitable openings $A^2$, provided in the casing A. It will be seen that by adjusting the screws $C^6$ at opposite sides of the plate the support and lens carried thereby may be laterally oscillated to secure the desired adjustment of the parts. This holding-plate is provided with an arm $C^7$, extending radially therefrom and having at its end a bearing-plate $C^8$, by means of which the plate and prism supported thereon may be oscillated upon the central bearing $C^9$, into which the holding-screw $C^4$ extends. The prism may be supported upon the plate $C'$ in any desired manner—for instance, by means of screws $C^{10}$, extending through recesses in the corners of the prisms into the plate or a supporting-bracket $C^{11}$, carried thereby.

The arm $C^7$ is adapted to be moved by means of an adjusting-screw D, mounted in a threaded bracket upon a plate $D'$ and having its end extended beyond the casing within a shield $D^2$. The point of this screw bears upon the plate $C^8$, and directly beneath the same is a tension-point $D^3$, comprising a hollow casing adapted to receive a spring $D^4$ and surrounded by a shell $D^5$, supported from the plate $D'$. This point moves in the adjustment of the screw and firmly holds the arm in its adjusted position.

Beneath the upper prism C is a lower prism E, disposed opposite the opening $A'$ in the front of the casing and secured in position by means of screws $E'$, engaging the prism and the supporting-plate $E^2$ thereof. This plate is fixed upon a quadrilateral, preferably upon the horizontal arm F thereof, which arm is pivotally supported at one end by a link $F'$ and at its opposite end by a link $F^2$, extending from a pivot $F^3$ and secured to an indicating-arm G in order to oscillate therewith. The link $F^2$ is fixed in its pivotal relations, while the link $F'$ is provided at its lower end with a pivot $F^4$, comprising a movable block mounted in a fixed casing $F^5$ and adapted to be adjusted by means of screws $F^6$, so as to vary the length of throw or travel of the horizontal arm F, as more fully described in connection with our prior patent, No. 686,771, so that the movement of the prism may be adjusted proportionately to the tangent of the angle through which it moves.

The indicating-arm G is provided with a segmental gear $G'$, meshing with a pinion $G^2$, carried upon a shaft $G^3$, which is provided at its outer end with an operating-knob $G^4$. This arm is also provided with a beveled edge $G^5$, adapted to operate in connection with an indicating-scale H, while the upper end of the arm is mounted upon the pivot $F^3$ and has secured thereto the link $F^2$, hereinbefore described, a suitable bearing-plate $G^6$ being provided for this pivot.

The distance-scale H is suitably graduated to correspond with any desired distances—for instance, yards and divisions thereof—while the vertical or base line $H'$ thereof curves slightly to one side toward the lower end of the scale proportionate to the curvature of the surface of the earth. This scale is slidingly mounted upon a supporting-plate $H^2$, which plate is provided at its upper end with a height-scale $H^3$ and at its lower end with an offing-scale $H^4$, each of which is suitably graduated, as set forth in the patents before mentioned. For the purpose of adjusting the distance-scale H relative to the height and offing scales a sleeve $H^5$ is secured to the back of the scale by means of a set-screw $H^6$ or otherwise, and through this sleeve an interiorly-threaded tube $H^7$ is passed and secured thereto by a screw $H^8$. This tube passes through a guide-sleeve $H^9$, carried by the frame $H^2$, and a tension-spring $H^{10}$ extends between the end of this guide and a head $H^{11}$ upon the tube. Mounted in the casing A is a threaded rod $H^{12}$, engaging the threads of the tube and having an extended operating end $H^{13}$, inclosed by a protecting-case $H^{14}$, so as to be readily adjusted by a suitable key for shifting the relation of the distance-scale to the other fixed scales. The opening at the front of the casing in alinement with the prism E is adapted to be screened to any desired extent by means of a slide $A^3$, provided with a handle $A^4$ and having its upper edge suitably beveled, as shown at $A^5$, so as to cut off more or less light. This slide is mounted in a way $A^6$, secured to the face of the casing and suitably undercut to retain the slide in position. The casing is also provided upon one side with any desired form of handle, as shown at $A^7$ in Fig. 2.

The instrument so far described is adapted for use when looking toward the sea where the horizon is visible and an intermediate object is to be observed, it being understood that the image of the object passes through the prisms and is reflected thereby upon one side of the object-glass of the telescope, while the direct image of the horizon is visible through the remaining portion of the object-glass. When taking an observation toward the land where the horizon is not visible, it is necessary to establish an artificial horizon, and this is accomplished by means of a reflecting attachment adapted to cover the portion of the object-lens which is otherwise free for a direct observation of the horizon. This attachment, as here illustrated, is composed of a casing I, having the front plate $I'$, provided at the upper portion with an opening $I^2$ and at the lower portion with an opening $I^3$, said lower portion being enlarged at $I^4$ to slide downward within the ways $A^6$, its movement being limited by a stop-pin $I^5$. Opposite the upper opening $A^2$ is an inclined reflecting-mirror J, mounted in a frame $J'$, pivoted at its lower end $J^2$ and adapted to be adjusted by means of a screw $J^3$, threaded at its lower end into said frame and having a surrounding spring $J^4$ disposed between the frame and casing, while the operating end of the screw is suitably protected by a casing-sleeve $J^5$.

Beneath the mirror J a lower reflecting-mirror K is disposed at a corresponding angle and in alinement with the uncovered portion of the object-lens $B^4$ of the telescope. This mirror is adapted to be adjusted upon the casing I by means of a bracket $K'$, centrally secured by a screw $K^2$, as shown by Figs. 7 and 8. At opposite sides of this central screw, which is mounted to permit an oscillatory movement of the bracket, are adjusting-screws K³, threaded in the casing and bearing against the vertical wall of the bracket, while at opposite sides of the securing-screw K² and at a right angle to the screws K³ are holding-screws K⁴, passing through the casing and threaded into the vertical wall of the bracket, so as to adjust and hold the bracket at any desired inclination necessary to secure the proper reflection. This rear reflecting device, while shown attached to the case of a range-finder, may be applied in any desired position to reflect the horizon in connection with the object viewed or used in relation to other forms of optical instrument from that herein shown. The term "range-finder," as herein used, is intended to cover all forms of distance-measuring instruments.

The operation of the details of this invention will be clearly apparent from the foregoing description, and the method of observation is substantially that of a sextant, two images being formed, one of the visible horizon and the other of the object observed. An adjustment of the indicating-arm is effected until these images are in alinement in the telescope, the result of which at once indicates upon the scale the distance of the object from the observer. It should be said that a suitable adjustment of the height-scale, mirrors, and other parts should be primarily effected, which will be obvious to one skilled in the art.

It will be seen that the construction herein presented permits the use of the instrument either looking directly seaward or toward the land, and the parts are so disposed as to occupy the minimum of space, producing an instrument which can be held like a sextant and completely protected within its casing, it being understood that when looking landward the reflection of the horizon is received over the head of the observer and from his rear.

It will be obvious that changes may be made in the details of construction and configuration without departing from the spirit of the invention as defined by the appended claims.

Having described our invention and set forth its merits, what we claim, and desire to secure by Letters Patent, is—

1. In a distance instrument, a casing, a telescope mounted therein and having a portion of its object-lens for direct observation, an object-prism adapted to reflect into the remaining portion of said object-lens, and a removable device to cover the direct-observation opening in the casing for reflecting the horizon at the back of the observer in the direct field of the lens.

2. In a distance-instrument, a casing, a telescope mounted therein and having a portion of its object-lens for direct observation, an object-prism adapted to reflect into the remaining portion of said object-lens, and a reflecting device adapted to cover the direct observation-opening and comprising a removable casing provided with oppositely-disposed mirrors within the same and openings therein in alinement with the mirrors.

3. In a distance instrument, a casing provided with an object-viewing device, means within said casing for reflecting an object therein, a reflecting device in alinement with a portion of the field of said viewing device comprising a casing having oppositely-disposed mirrors in alinement with the openings at the upper and lower portions thereof, and means for pivoting the upper mirror in said casing for movement relative to the lower mirror therein.

4. In a distance instrument, an object-viewing device, and a rear reflecting device comprising oppositely-disposed mirrors, the lower one of which is in alinement with a portion of the field of the object-viewing device and the upper mirror adjustable relative thereto.

5. In a range-finder, a casing provided with a telescope, means within said casing for reflecting an object therein, a reflecting device in alinement with the field of said telescope comprising a casing having oppositely-disposed mirrors in alinement with openings at the upper and lower portions thereof, means for pivoting the upper mirror in said casing, an adjusting-screw extending downward into the frame of the upper mirror for oscillating the same upon its pivot, and means for laterally adjusting the lower mirror.

6. In a range-finder, a casing provided with a telescope, means within said casing for reflecting an object therein, a reflecting device in alinement with the field of said telescope comprising a casing having oppositely-disposed mirrors in alinement with openings at the upper and lower portions thereof, means for pivoting the upper mirror in said casing, an adjusting-screw extending downward into the frame of the upper mirror for oscillating the same upon its pivot, a bracket for the lower mirror supported by a screw from the casing of the reflecting device, and adjusting-screws at opposite sides of said holding-screw and threaded through the casing to bear upon the bracket.

7. In a range-finder, a casing provided with a telescope, means within said casing for reflecting an object therein, a reflecting device in alinement with the field of said telescope comprising a casing having oppositely-disposed mirrors in alinement with openings at the upper and lower portions thereof, means for pivoting the upper mirror in said casing, an adjusting-screw extending downward into the frame of the upper mirror for oscillating the same upon its pivot, a bracket for the lower mirror supported by a screw from the casing of the reflecting device, adjusting-screws at opposite sides of said holding-screw and threaded through the casing to bear upon the bracket, and holding-screws at opposite sides of the securing-screw and at right angles to the adjusting-screws, said holding-screws being threaded into a wall of the bracket.

8. In a range-finder, a casing having a sight-opening at one side, a telescope located therein, object-reflecting means within said casing, and a reflecting device adapted for attachment to said casing over the upper portion of said sight-opening.

9. In a range-finder, a casing having a sight-opening at one side, a telescope located therein, object-reflecting means within said casing, a reflecting device adapted for attachment to said casing over the upper portion of said sight-opening, and a light-reducing slide mounted upon the casing to operate over the lower portion of said sight-opening.

10. In a range-finder, a casing, a telescope therein, an object-reflecting device arranged to project an image into the field of said telescope, means for adjusting said device, an indicating-arm carried by said means, and a measuring-scale coöperating with said arm and having its base-line curved to conform with the curvature of the earth.

11. In a range-finder, a casing, a telescope therein, an object-reflecting device arranged to project an image into the field of said telescope, means for adjusting said device, an indicating-arm carried by said means, a measuring-scale coöperating with said arm and having its base-line curved to conform with the curvature of the earth, a segmental gear carried by said arm, and a pinion mounted in the casing and meshing with said gear.

12. In a range-finder, a casing, a telescope therein, an object-reflecting device arranged to project an image into the field of said telescope, means for adjusting said device, an indicating-arm carried by said means, a measuring-scale coöperating with said arm and having its base-line curved to conform with the curvature of the earth, a segmental gear carried by said arm, a pinion mounted in the casing and meshing with said gear, and means for adjusting one of the supports for said object-reflecting device toward and from the other.

13. In a range-finder, a casing, a telescope therein, an object-reflecting device arranged to project an image into the field of said telescope, means for adjusting said device, an indicating-arm carried by said means, a measuring-scale coöperating with said arm and having its base-line curved to conform with the curvature of the earth, a segmental gear carried by said arm, a pinion mounted in the casing and meshing with said gear, means for adjusting one of the supports for said object-reflecting device toward and from the other, a fixed height-scale at one end of said measuring-scale, a fixed offing-scale at the opposite end thereof, and means for adjusting said measuring-scale laterally of the height and offing scales.

14. In a range-finder, a casing, a telescope therein, an object-reflecting device, means for adjusting said device, an indicating-arm carried by a pivot of said adjusting means, a laterally-movable measuring-scale beneath said arm, a sleeve secured to the rear of said scale, an interiorly-threaded tube secured to said sleeve, an adjusting-screw mounted in the casing and entering said sleeve, a fixed collar through which said tube reciprocates, a head upon one end of said tube, and a spring disposed between said head and collar.

15. In a distance instrument, a casing, a telescope therein, an adjustable reflecting device within said casing, a scale within said casing in alinement with a sight-opening therein, an indicating-arm within said casing coöperating with said scale, and means upon the exterior of the casing having connections upon the interior thereof for operating said arm.

16. In a distance instrument, an object-viewing device, an object-reflecting prism adapted to cover more than one-half of the area thereof, and means for permitting a direct unobstructed view of the horizon upon the remaining portion whereby an equal light and intensity of image is secured.

17. In a distance instrument, a casing, an object-viewing device mounted at the upper portion thereof, an upper reflecting-prism covering a portion of the field of said device, a lower reflecting-prism in alinement beneath the upper prism and having its reflecting-face parallel therewith, and means for adjusting said lower prism.

18. In a distance instrument, a casing, an object-viewing device mounted at the upper portion thereof, an upper reflecting-prism covering a portion of the field of said device, a lower reflecting-prism in alinement beneath the upper prism and having its reflecting-face parallel therewith, means for adjusting said lower prism, and means for oscillating said upper prism upon its support.

19. In a range-finder, a casing, a telescope mounted at the upper portion thereof, an upper reflecting-prism covering a portion of the field of said telescope, a lower reflecting-prism in alinement beneath the upper prism, a supporting-plate for said upper prism having a transverse bearing upon its reverse side, a holding-plate secured to the casing, and adjustable screws passing through said holding-plate into said supporting-plate.

20. In a range-finder, a casing, a telescope mounted at the upper portion thereof, an upper reflecting-prism covering a portion of the field of said telescope, a lower reflecting-prism in alinement beneath the upper prism, a supporting-plate for said upper prism having a transverse bearing upon its reverse side, a holding-plate secured to the casing, adjustable screws passing through said holding-plate into said supporting-plate, a lever-arm extending from said holding-plate, and means for oscillating said arm and plate upon a central pivot.

21. In a range-finder, a casing, a telescope mounted at the upper portion thereof, an upper reflecting-prism covering a portion of the field of said telescope, a lower reflecting-prism in alinement beneath the upper prism, a supporting-plate for said upper prism having a transverse bearing upon its reverse side, a holding-plate secured to the casing, adjustable screws passing through said holding-plate into said supporting-plate, a lever-arm extending from said holding-plate, a spring-contact beneath said lever-arm, and an adjustable screw extending through the casing and bearing upon the upper surface of said arm.

22. In a range-finder, a casing, a telescope mounted at the upper portion thereof, an upper reflecting-prism covering a portion of the field of said telescope, a lower reflecting-prism in alinement beneath the upper prism, a supporting-plate for said upper prism having a transverse bearing upon its reverse side, a holding-plate secured to the casing, adjustable screws passing through said holding-plate into said supporting-plate, a lever-arm extending from said holding-plate, a spring-contact beneath said lever-arm, an adjustable screw extending through the casing and bearing upon the upper surface of said arm, a swinging support for the lower prism, a fixed pivot at one end of said support having an indicating-arm extending therefrom, a link at the opposite end of said support, means for adjusting the lower end of the link toward and from the fixed pivot, and a measuring-scale coöperating with said arm.

23. In a range-finder, a casing, a telescope mounted at the upper portion thereof, an upper reflecting-prism covering a portion of the field of said telescope, a lower reflecting-prism in alinement beneath the upper prism, a supporting-plate for said upper prism having a transverse bearing upon its reverse side, a holding-plate secured to the casing, adjustable screws passing through said holding-plate into said supporting-plate, a lever-arm extending from said holding-plate, a spring-contact beneath said lever-arm, an adjustable screw extending through the casing and bearing upon the upper surface of said arm, a swinging support for the lower prism, a fixed pivot at one end of said support having an indicating-arm extending therefrom, a link at the opposite end of said support, means for adjusting the lower end of the link toward and from the fixed pivot, a measuring-scale coöperating with said arm, a height-scale at one end of said measuring-scale, an offing-scale at the lower end thereof, and means for adjusting said measuring-scale relative to the height and offing scales.

24. In a range-finder, a casing, a telescope mounted at the upper portion thereof, an upper reflecting-prism covering a portion of the field of said telescope, a lower reflecting-prism in alinement beneath the upper prism, a supporting-plate for said upper prism having a transverse bearing upon its reverse side, a holding-plate secured to the casing, adjustable screws passing through said holding-plate into said supporting-plate, a lever-arm extending from said holding-plate, a spring-contact beneath said lever-arm, an adjustable screw extending through the casing and bearing upon the upper surface of said arm, a swinging support for the lower prism, a fixed pivot at one end of said support having an indicating-arm extending therefrom, a link at the opposite end of said support, means for adjusting the lower end of the link toward and from the fixed pivot, a measuring-scale coöperating with said arm, a height-scale at one end of said measuring-scale, an offing-scale at the lower end thereof, means for adjusting said measuring-scale relative to the height and offing scales, a slideway at a sight-opening in the case, and a slide in said way having a beveled upper edge.

25. In a range-finder, a casing, a telescope mounted at the upper portion thereof, an upper reflecting-prism covering a portion of the field of said telescope, a lower reflecting-prism in alinement beneath the upper prism, a supporting-plate for said upper prism having a transverse bearing upon its reverse side, a holding-plate secured to the casing, adjustable screws passing through said holding-plate into said supporting-plate, a lever-arm extending from said holding-plate, a spring-contact beneath said lever-arm, an adjustable screw extending through the casing and bearing upon the upper surface of said arm, a swinging support for the lower prism, a fixed pivot at one end of said support having an indicating-arm extending therefrom, a link at the opposite end of said support, means for adjusting the lower end of the link toward and from the fixed pivot, a measuring-scale coöperating with said arm, a height-scale at one end of said measuring-scale, an offing-scale at the lower end thereof, means for adjusting said measuring-scale relative to the height and offing scales, a slideway at a sight-opening in the case, a slide in said way having a beveled upper edge, and a reflecting device adapted to enter said slideway and reflect an image through one side of the sight-opening parallel to the upper prism.

In testimony whereof we affix our signatures in presence of two witnesses.

GEORGE N. SAEGMULLER.
  GEORGE M. SEARLE.

Witnesses as to Geo. N. Saegmuller:
 ALFRED T. GAGE,
 E. J. BEVERSTOCK.

Witnesses as to George M. Searle:
 JOSEPH P. DAY,
 DUDLEY C. HAMER.